United States Patent

Hattori et al.

(10) Patent No.: US 7,446,993 B2
(45) Date of Patent: Nov. 4, 2008

(54) ALUMINA SINTERED BODY

(75) Inventors: Akiyoshi Hattori, Nagoya (JP); Yutaka Mori, Nagoya (JP); Kazuhiro Nobori, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/688,332

(22) Filed: Mar. 20, 2007

(65) Prior Publication Data

US 2007/0223167 A1 Sep. 27, 2007

(30) Foreign Application Priority Data

Mar. 24, 2006 (JP) ............................ 2006-084119

(51) Int. Cl.
*H01T 23/00* (2006.01)
(52) U.S. Cl. ...................... 361/230; 361/234
(58) Field of Classification Search .......... 361/230–234
See application file for complete search history.

(56) References Cited

U.S. PATENT DOCUMENTS

| | | | |
|---|---|---|---|
| 6,590,760 B1 * | 7/2003 | Fujii | 361/234 |
| 6,617,514 B1 | 9/2003 | Ushikoshi et al. | |
| 6,744,618 B2 * | 6/2004 | Divakar et al. | 361/234 |
| 6,992,876 B1 * | 1/2006 | Nakajima et al. | 361/234 |

FOREIGN PATENT DOCUMENTS

| | | |
|---|---|---|
| JP | 11-012053 A1 | 1/1999 |
| JP | 2003-243494 A1 | 8/2003 |

\* cited by examiner

*Primary Examiner*—Michael J Sherry
*Assistant Examiner*—Danny Nguyen
(74) *Attorney, Agent, or Firm*—Burr & Brown

(57) ABSTRACT

An alumina sintered body comprises an alumina substrate having a first main surface and a second main surface opposing each other, an embedded film electrode made of a metal and embedded in the alumina substrate at a depth $H_D$ of 0.4 mm or less from a first main surface $SF_1$, and an embedded terminal formed of a metal, embedded in the alumina substrate nearer a second main surface $SF_2$ side than the embedded electrode. The embedded terminal is in contact with the embedded electrode and a film thickness $H_E$ of the embedded electrode is 25 μm or less.

6 Claims, 5 Drawing Sheets

FIG. 3

| THICKNESS OF ELECTRODE (um) | R-SHAPE OF TABLET | THICKNESS OF DIELECTRIC LAYER (mm) | NUMBER OF GENERATED CRACKS | GENERATION RATE |
|---|---|---|---|---|
| 10 | RIGHT ANGLE | 0.4 | 1/9 | 11% |
| 10 | 0.2 | 0.4 | 0/9 | 0% |
| 10 | 0.5 | 0.4 | 0/9 | 0% |
| 20 | RIGHT ANGLE | 0.4 | 2/9 | 22% |
| 20 | 0.2 | 0.4 | 1/9 | 11% |
| 20 | 0.5 | 0.4 | 0/9 | 0% |
| 25 | RIGHT ANGLE | 0.4 | 3/9 | 33% |
| 25 | 0.2 | 0.4 | 1/9 | 11% |
| 25 | 0.5 | 0.4 | 0/9 | 0% |
| 30 | RIGHT ANGLE | 0.4 | 4/9 | 44% |
| 30 | 0.2 | 0.4 | 2/9 | 22% |
| 30 | 0.5 | 0.4 | 1/9 | 11% |
| 10 | RIGHT ANGLE | 0.2 | 2/9 | 22% |
| 10 | 0.2 | 0.2 | 1/9 | 11% |
| 10 | 0.5 | 0.2 | 0/9 | 0% |
| 20 | RIGHT ANGLE | 0.2 | 4/9 | 44% |
| 20 | 0.2 | 0.2 | 2/9 | 22% |
| 20 | 0.5 | 0.2 | 0/9 | 0% |
| 25 | RIGHT ANGLE | 0.2 | 6/9 | 67% |
| 25 | 0.2 | 0.2 | 3/9 | 33% |
| 25 | 0.5 | 0.2 | 1/9 | 11% |
| 30 | RIGHT ANGLE | 0.2 | 8/9 | 89% |
| 30 | 0.2 | 0.2 | 4/9 | 44% |
| 30 | 0.5 | 0.2 | 2/9 | 22% |

FIG. 4

| THICKNESS OF ELECTRODE (um) | R-SHAPE OF TABLET | THICKNESS OF DIELECTRIC LAYER (mm) | NUMBER OF GENERATED CRACKS | GENERATION RATE |
|---|---|---|---|---|
| 10 | RIGHT ANGLE | 5 | 0/9 | 0% |
| 10 | 0.2 | 5 | 0/9 | 0% |
| 10 | 0.5 | 5 | 0/9 | 0% |
| 20 | RIGHT ANGLE | 5 | 0/9 | 0% |
| 20 | 0.2 | 5 | 0/9 | 0% |
| 20 | 0.5 | 5 | 0/9 | 0% |
| 30 | RIGHT ANGLE | 5 | 0/9 | 0% |
| 30 | 0.2 | 5 | 0/9 | 0% |
| 30 | 0.5 | 5 | 0/9 | 0% |
| 10 | RIGHT ANGLE | 1 | 0/9 | 0% |
| 10 | 0.2 | 1 | 0/9 | 0% |
| 10 | 0.5 | 1 | 0/9 | 0% |
| 20 | RIGHT ANGLE | 1 | 0/9 | 0% |
| 20 | 0.2 | 1 | 0/9 | 0% |
| 20 | 0.5 | 1 | 0/9 | 0% |
| 30 | RIGHT ANGLE | 1 | 0/9 | 0% |
| 30 | 0.2 | 1 | 0/9 | 0% |
| 30 | 0.5 | 1 | 0/9 | 0% |

ALUMINA SINTERED BODY

CROSS REFERENCE TO RELATED APPLICATION

This application is based upon and claims the benefit of priority from a Japanese Patent Application No. TOKUGAN2006-084119, filed on Mar. 24, 2006; the entire contents of which are incorporated herein by reference.

BACKGROUND OF THE INVENTION

1. Field of the Invention

The present invention relates to an alumina sintered body having an electrode embedded therein, such as a heater, an electrostatic chuck, and a susceptor for high frequency application, which are used in a semiconductor manufacturing device such as a CVD device and an etching device.

2. Description of the Related Art

In a conventional semiconductor manufacturing process, an alumina member, such as an electrostatic chuck having an electrode embedded in an alumina sintered body and a heating device having a resistance heating element embedded in an alumina sintered body is used. As disclosed in Japanese Patent Application Laid-open No. H11-12053, there is a known device in which a metal terminal is further embedded in contact with a metal electrode in a ceramic substrate on the back surface side opposite to the surface on which a wafer is to be mounted and a power-supply connector is connected to the metal terminal to supply the power to the metal electrode.

However, particularly in the case of a Coulomb-type electrostatic chuck using an alumina sintered body, the thickness of a dielectric layer is generally as thin as 0.4 mm or less, and it can lower the strength thereof. As the thickness decreases, cracks can be generated in the alumina substrate between the wafer mounting surface and the metal electrode when the alumina substrate is integrally sintered with the metal electrode and the metal terminal, since a thermal expansion coefficient differs between alumina and a metal. As the distance from the wafer mounting surface to the metal electrode decreases, the strength of the corresponding alumina substrate decreases, and a crack generation rate increases accordingly. A product having cracks becomes a defective product, and its yield is decreased.

SUMMARY OF THE INVENTION

An alumina sintered body of the present invention comprises an alumina substrate having a first main surface and a second main surface opposing each other, an embedded film electrode made of a metal and embedded in the alumina substrate at a depth of 0.4 mm or less from the first main surface, and an embedded terminal embedded in the alumina substrate nearer to the second main surface side than the embedded electrode. The embedded terminal is in contact with the embedded electrode and the film thickness of the embedded electrode is 25 μm or less. According to the present invention, even though the distance from the first main surface to the embedded electrode is 0.4 mm or less, a crack generation rate can be reduced by setting the thickness of the embedded electrode at 25 μm or less.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 3 is a table showing results of experiments conducted by the present inventors (Part 1);

FIG. 4 is a table showing results of experiments conducted by the present inventors (Part 2);

DETAILED DESCRIPTION OF THE PREFERRED EMBODIMENTS

Embodiments of the present invention will be explained below with reference to the accompanying drawings.

Figure 1:
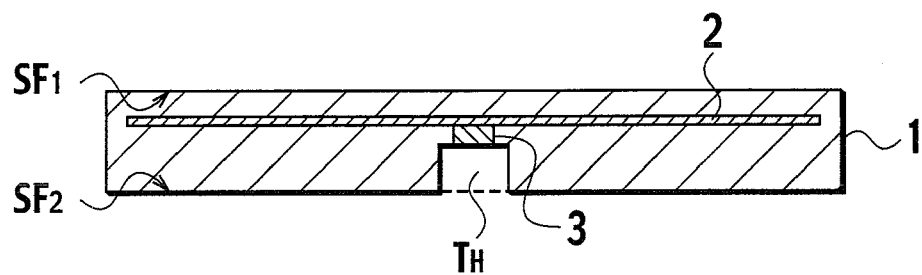
FIG. 1 is a sectional view showing an entire structure of an electrostatic chuck shown as an example of an alumina sintered body according to an embodiment of the present invention.

FIG. 1 is a sectional view showing an entire structure of an electrostatic chuck shown as an example of an alumina sintered body according to an embodiment of the present invention. The electrostatic chuck comprises an alumina substrate 1 having a first main surface $SF_1$ and a second main surface $SF_2$ opposing each other, an embedded film electrode 2 made of a metal and embedded in the alumina substrate 1, and an embedded terminal 3 formed of a metal and embedded in the alumina substrate 1.

The alumina substrate 1 is a nearly disk-shaped substrate having the first main surface $SF_1$ and the second main surface $SF_2$ arranged in parallel. The embedded electrode 2 is a film-shaped electrode arranged in parallel to the first main surface $SF_1$. The embedded terminal 3 has a tablet shape, arranged at a center portion of the alumina substrate 1, and electrically connected to the embedded electrode 2 at the side of the second main surface $SF_2$.

A hole $T_H$ is formed at the center of the alumina substrate 1. The hole is dug from the second main surface side. The surface of the embedded terminal 3, which is an opposite surface to the contact surface at which the embedded terminal 3 is in contact with the embedded electrode 2, is exposed in the bottom of the hole $T_H$. A power-supply connector (not shown in FIG. 1) is inserted through the hole $T_H$ and the power supply connecter is electrically connected to the embedded terminal 3. In this way, the power can be supplied to the embedded electrode 2.

Figure 2:
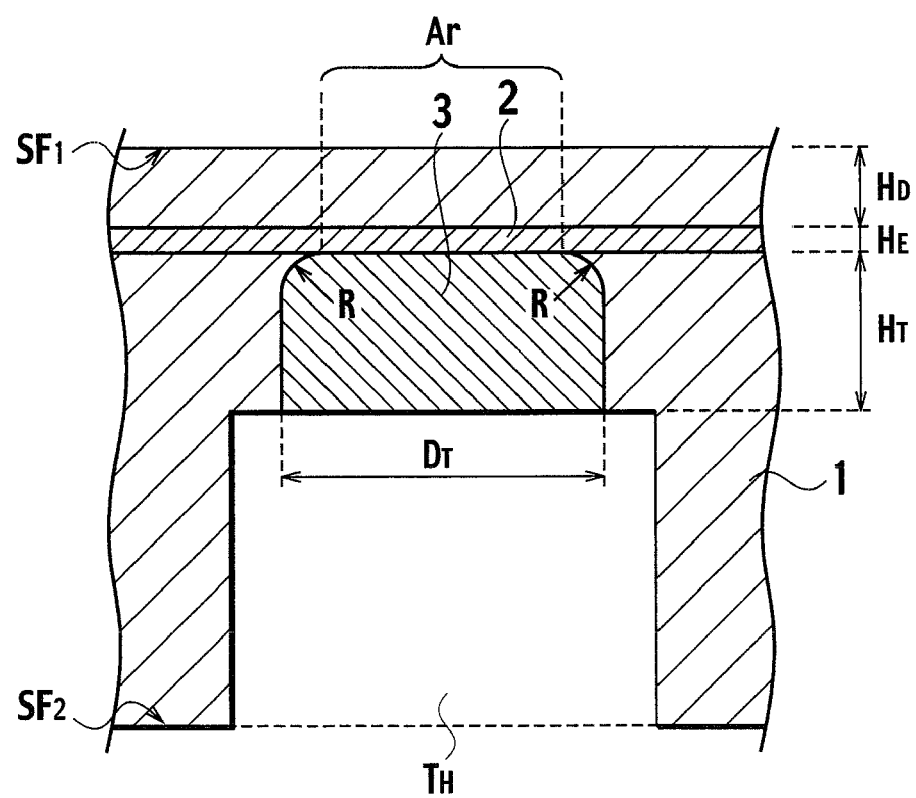
FIG. 2 is an enlarged sectional view of a center portion of an alumina substrate shown in FIG. 1.

With reference to FIG. 2, the structure of the center portion of the alumina substrate 1 will be more specifically explained. The embedded electrode 2 is formed at a depth $H_D$ of 0.4 mm or less from the first main surface $SF_1$. The film thickness $H_E$ of the embedded electrode 2 is 25 μm or less. The depth $H_D$ corresponds to the "thickness of the dielectric layer" of the electrostatic chuck.

The embedded terminal 3 is in contact with the embedded electrode 2. In the contact surface Ar at which the embedded terminal 3 is in contact with the embedded electrode 2, the outer peripheral portion of the embedded terminal 3 is desirably chamfered. That is, a curved surface having a radius of curvature R is desirably formed at the intersection between the contact surface Ar of the embedded terminal 3 and the side surface thereof. Further desirably, the radius of curvature R of the peripheral portion chamfered is 0.2 mm or more.

As the embedded electrode 2, for example, a printed electrode can be used, which is formed by printing a print paste containing a conductive material powder having a high-melting point in a form of mesh, comb, or disk. More specifically, metals having a high-melting point such as tungsten (W), niobium (Nb), molybdenum (Mo), and platinum (Pt), alloys thereof and compounds of a metal having a high-melting point such as tungsten carbide (WC) can be used. In place of the printed electrode, a mesh bulk body (wire netting) of a high-melting point conductive material, a porous bulk body (punching metal) formed of a high-melting point conductive material and the like can be used.

The embedded terminal 3 has a cylindrical shape defined by the contact surface Ar, an exterior contact surface opposite to the contact surface Ar and a side surface connecting between the contact surface Ar and the exterior contact surface. The diameter $D_T$ thereof is 1 to 3 mm and the height $H_T$ thereof is 0.3 to 1.5 mm. The embedded terminal 3 is formed of a high-melting point metal or a compound thereof having a thermal expansion coefficient, which desirably differs from that of an alumina sintered body within $2\times10^{-6}$ (/K) or less. When the difference in thermal expansion coefficient is larger than this, there is a high possibility to generate cracks in the dielectric layer. More specifically, the embedded terminal 3 is formed of a metal containing at least one of platinum, niobium, and vanadium.

The alumina substrate 1 is formed by molding an alumina powder and sintering the molded product while applying pressure. The embedded electrode 2 and embedded terminal 3 are integrally sintered with the alumina substrate 1.

According to the electrostatic chuck shown in FIGS. 1 and 2, the following functional effects can be obtained.

Figure 7:
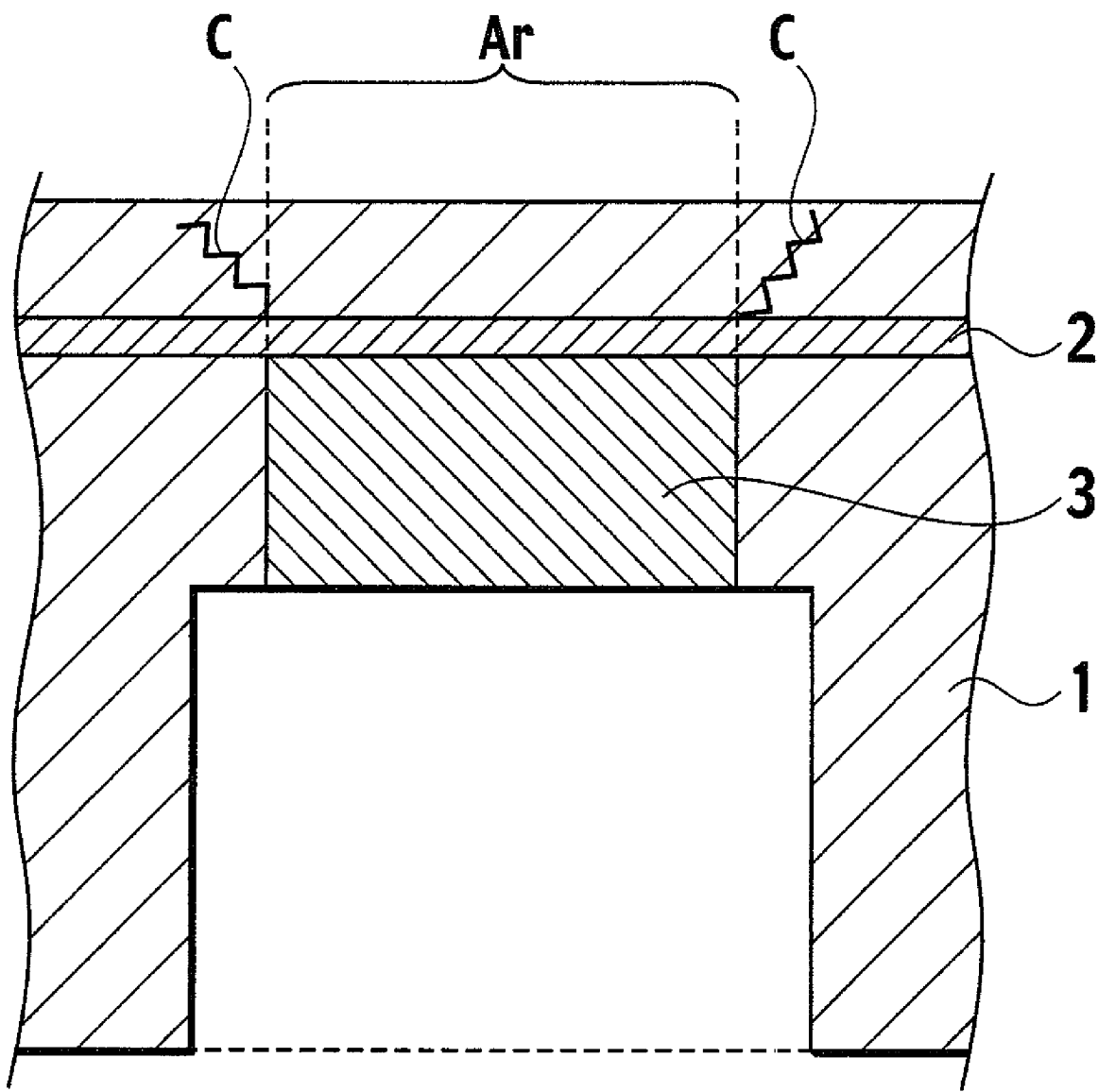
FIG. 7 is a sectional view for explaining generated cracks in a dielectric layer of an alumina substrate.

Since the materials of the alumina substrate 1, embedded electrode 2 and embedded terminal 3 differ from each other, the thermal expansion coefficients of them differ from each other. Because of difference in thermal expansion coefficient, stress is generated between the alumina substrate 1, the embedded electrode 2 and the embedded terminal 3, when the alumina substrate 1 is sintered. When the thickness (depth $H_D$) of the dielectric layer of the electrostatic chuck is reduced, the mechanical strength of the dielectric layer decreases. When the stress becomes larger than the strength of the dietric layer, cracks C are generated in the dielectric layer, as shown in FIG. 7.

Particularly, the generation of the crack C is sometimes started from the outer edge of the contact surface Ar between the embedded terminal 3 and the embedded electrode 2. The cracks C are generated in this portion for the following reasons. At the time of sintering, the embedded terminal 3 and the embedded electrode 2 react with each other via the contact surface Ar. As a result, a part of the embedded electrode 2 positioned on the contact surface Ar is alloyed with the embedded terminal 3. Thus, the metal of alloyed part of the embedded electrode 2 differs from those of the embedded terminal 3 and embedded electrode 2 and the thermal expansion coefficient thereof differs from those of the alumina substrate 1, embedded terminal 3 and embedded electrode 2. Therefore, in the portion having the cracks C shown in FIG. 7, not only the alumina substrate 1, embedded electrode 2 and embedded terminal 3 but also an alloy of the embedded electrode 2 with the embedded terminal 3 is present in the proximity with each other. As a result, stress converges to the portion and the cracks C are generated.

In the present embodiment, to suppress the generation of the cracks C by reducing the stress generated by the alloyed embedded electrode 2 as well as to reduce the volume of the alloyed embedded electrode 2, the film thickness of the embedded electrode 2 is reduced. In short, the volume of the embedded electrode 2 to be alloyed is reduced by reducing the film thickness (film thickness $H_E$ is reduced to 25 μm or less) of the embedded electrode 2. With this arrangement, the stress due to the alloyed embedded electrode 2 is lowered, thereby suppressing the generation of the cracks C.

Since the generation of the cracks C is started from the outer peripheral portion of the embedded terminal 3, stress converges to the outer peripheral portion of the embedded terminal 3. The outer peripheral portion of the embedded terminal 3 of the contact surface Ar, at which the embedded terminal 3 is in contact with the embedded electrode 2, is then chamfered. In this manner, convergence of stress to the outer peripheral portion of the embedded terminal 3 can be avoided.

With reference to FIGS. 3 and 4, results of experiments conducted by the present inventors will be explained by way of example. The term "Thickness of electrode" refers to the film thickness $H_E$ (μm) of the embedded electrode 2. The term "R-shape of tablet" refers to a radius of curvature R (mm) of the chamfered outer peripheral potion of the embedded terminal 3. The term "Thickness of dielectric layer" refers to the depth $H_D$ (mm) from the first main surface $SF_1$ to the embedded electrode 2. The term "Number of generated cracks" refers to the number (n) of samples having cracks generated thereon of nine samples and expressed by a fraction (n/9). The term "Generation rate" refers to a probability of the crack generation, which is expressed in percentage. Note that the term "right angle" indicates that the outer peripheral portion of the embedded terminal 3 is not chamfered.

First, the case where the thickness of the dielectric layer is 0.4 mm shown in FIG. 3 was examined. When the thickness of the electrode was 30 μm, not less than one of nine samples had cracks regardless of the R-shape of tablet. In the case where the thickness of the electrode was reduced to 25 μm and the R-shape of tablet was 0.5 mm, the crack generation rate became 0%. When the case where an electrode thickness of 30 μm is compared to the cases where an electrode thickness of 25 μm with respect to other R-shapes of tablet, it can be found that a crack generation rate decreases when the electrode thickness is reduced to 25 μm in all R-shapes of tablet. Furthermore, when the electrode thickness of 25 μm is compared to that of 20 μm, the crack generation rate can be reduced by reducing the electrode thickness to 20 μm even though the R-shape of tablet is the right angle. Similarly, when the electrode thickness is reduced from 20 μm to 10 μm, the crack generation rate can be further reduced.

The same results were obtained in the case where the thickness of the dielectric layer was 0.2 mm. To describe more specifically, as the thickness of the electrode was reduced to 30 μm, 25 μm, 20 μm, and 10 μm in this order, the crack generation rate was sequentially decreased.

Furthermore, focusing only on R-shape of tablet, the crack generation rate decreases as the radius of curvature increases from angle 0 to 0.2 mm and 0.5 mm.

The experimental data was obtained when platinum was used as the material for the embedded terminal 3.

FIG. 4 shows experimental results in the cases where the thickness of the dielectric layer is 5 mm and 1 mm. No crack was generated when the electrode thickness falls within the range of 10 μm to 30 μm regardless of R-shape of tablet.

Accordingly, the present invention provides suitable functional effects in the case where the thickness of the dielectric layer was 0.4 mm.

The present invention has been explained by an embodiment thereof. However, the descriptions and drawings, which constitute a part of the disclosure, will not be construed as limiting the invention. From this disclosure, various types of alternative embodiments, examples, and application techniques will easily occur to those skilled in the art.

In the above embodiment, an electrostatic chuck, in which an electrode for an electrostatic chuck is embedded in an alumina substrate 1, has been exemplified as an alumina sintered body. However, an alumina sintered body according to the present invention is not limited thereto. Other examples thereof include a heater having a resistance heating element embedded in an alumina sintered body, a heater attached with an electrostatic chuck having a resistance heating element and an electrode for an electrostatic chuck embedded in an alumina sintered body, an electrode device for high frequency generation having a plasma generation electrode embedded in an alumina substrate, and an electrode device for high frequency generation having a plasma generation electrode and a resistance heating element embedded in an alumina substrate.

With reference also to FIGS. 1 and 2, the case where the embedded electrode 2 is formed of a flat plate printed electrode has been explained. However, the invention is not limited thereto and can be applied to electrodes where a linear or plate material is arranged in a form of lattice, reticular, helical, or zigzag. For example, as shown in FIGS. 5 and 6, an embedded electrode 12 formed of wire netting or mesh can be embedded in the alumina substrate 1 in place of the embedded electrode 2 shown in FIGS. 1 and 2.

Figure 5:
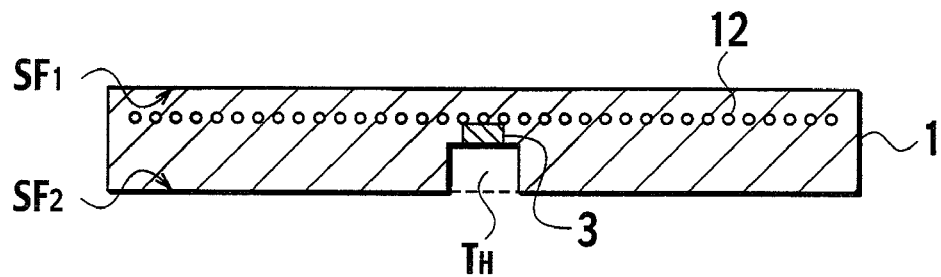
FIG. 5 is a sectional view showing an alumina sintered body having a mesh-type electrode embedded in an alumina substrate.

As shown in FIG. 5, the alumina substrate 1 has a disk shape having a first main surface $SF_1$ and a second main surface $SF_2$ arranged in parallel. The embedded electrode 12 is arranged in parallel to the first main surface $SF_1$. An embedded terminal 3 has a tablet shape and arranged at the center of the alumina substrate 1 and electrically connected to the embedded electrode 12 on the side of the second main surface $SF_2$.

Figure 6:
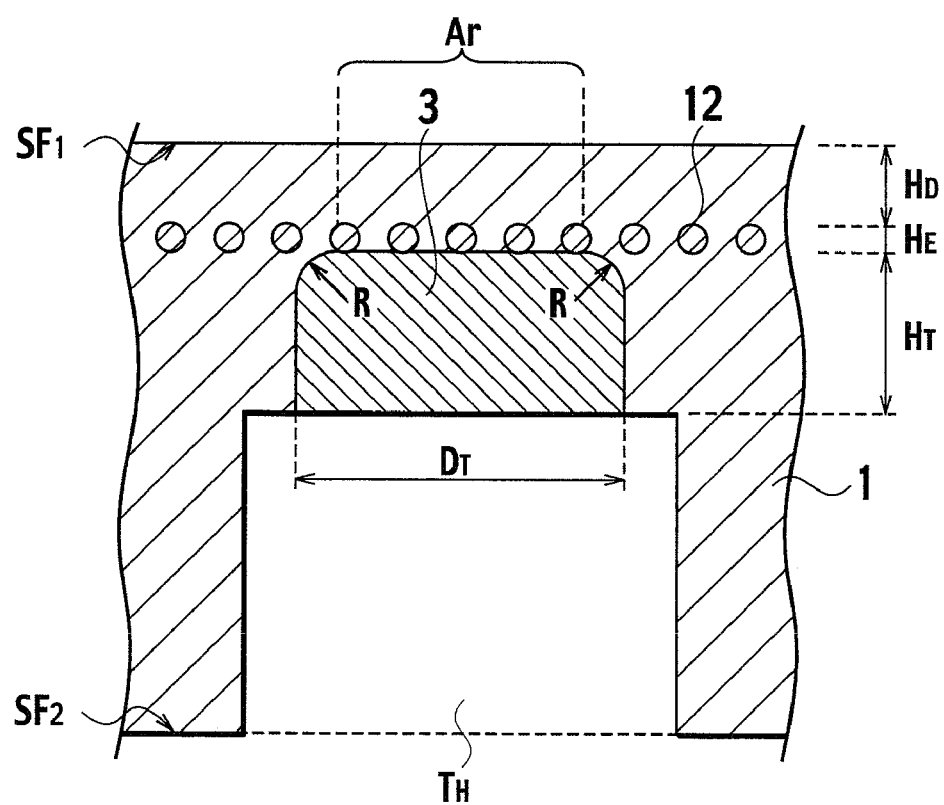
FIG. 6 is an enlarged sectional view of a center portion of the alumina substrate shown in FIG. 5.

As shown in FIG. 6, the embedded electrode 12 is embedded at a depth of 0.4 mm or less from the first main surface $SF_1$. The line width $H_E$ of the embedded electrode 12 is 25 μm or less. The embedded terminal 3 is in contact with the embedded electrode 12. It is desirable that the outer peripheral portion of the embedded terminal 3 is chamfered at the contact surface Ar at which the embedded terminal 3 is in contact with the embedded electrode 12. It is further desirable that a radius of curvature R of the outer peripheral portion thus chamfered is 0.2 mm or more.

What is claimed is:

1. An alumina sintered body comprising:
   an alumina substrate having a first main surface and a second main surface opposing each other;
   an embedded film electrode made of a metal and embedded in the alumina substrate at a depth of 0.4 mm or less from the first main surface; and
   an embedded terminal formed of a metal, embedded in the alumina substrate nearer the second main surface side than the embedded electrode, the embedded terminal being positioned at the base of a hole having a diameter larger than the embedded terminal, an outer peripheral portion of the embedded terminal being chamfered or radiused at a contact surface at which the embedded terminal is in contact with the embedded electrode,
   wherein a portion of the embedded electrode positioned on the contact surface between the embedded terminal and the embedded electrode is alloyed with the embedded terminal by integrally sintering the embedded terminal and electrode, and
   wherein a film thickness of the embedded electrode is 25 μm or less.

2. The alumina sintered body according to claim 1, wherein a radius of curvature of the outer peripheral portion chamfered is 0.2 mm or more.

3. The alumina sintered body according to claim 1, wherein the embedded electrode is formed of at least one metal having a high-melting point, alloys thereof, or compounds thereof.

4. The alumina sintered body according to claim 1, wherein the embedded electrode is a flat plate printed electrode.

5. The alumina sintered body according to claim 1, wherein the embedded terminal is formed of a high-melting point metal or a compound thereof having a thermal expansion coefficient, that differs from that of an alumina sintered body by $2 \times 10^{-6}$ or less.

6. The alumina sintered body according to claim 1, wherein the embedded terminal is formed of a metal containing at least one of platinum, niobium, and vanadium.

* * * * *